United States Patent
Masters et al.

(10) Patent No.: US 7,371,080 B1
(45) Date of Patent: May 13, 2008

(54) POWER DISTRIBUTION BOX

(75) Inventors: Brian R. Masters, Hartland, MI (US); Christopher J. Darr, Livonia, MI (US); John N. Topolewski, Westland, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/733,359

(22) Filed: Apr. 10, 2007

(51) Int. Cl.
   *H01R 12/00* (2006.01)
(52) U.S. Cl. .................... 439/76.2; 439/949
(58) Field of Classification Search .......... 439/76.2, 439/76.1, 949
   See application file for complete search history.

(56) References Cited

U.S. PATENT DOCUMENTS

| | | | |
|---|---|---|---|
| 5,207,591 A | 5/1993 | Ozaki et al. | |
| 5,295,842 A | 3/1994 | Ozaki et al. | |
| 5,722,851 A | 3/1998 | Onizuka et al. | |
| 5,755,579 A | 5/1998 | Yanase et al. | |
| 5,785,532 A | 7/1998 | Maue et al. | |
| 5,795,193 A | 8/1998 | Yang | |
| 5,995,380 A | 11/1999 | Maue et al. | |
| 6,203,358 B1 | 3/2001 | Kasai | |
| 6,488,551 B1 | 12/2002 | Tomlin et al. | |
| 6,712,623 B2 * | 3/2004 | Sumida | 439/76.2 |
| 6,780,026 B2 | 8/2004 | Sato | |
| 6,887,084 B2 | 5/2005 | Saito et al. | |
| 7,063,543 B2 | 6/2006 | Okano et al. | |
| 2002/0031924 A1 * | 3/2002 | Davis et al. | 439/76.2 |
| 2002/0101724 A1 | 8/2002 | Iwata | |
| 2004/0058570 A1 * | 3/2004 | Oda et al. | 439/76.2 |
| 2005/0112956 A1 | 5/2005 | Tsugane et al. | |
| 2006/0246752 A1 * | 11/2006 | Ishiguro et al. | 439/76.2 |

* cited by examiner

*Primary Examiner*—Tho D. Ta
*Assistant Examiner*—Travis Chambers
(74) *Attorney, Agent, or Firm*—Brooks Kushman P.C.

(57) ABSTRACT

A Power Distribution Boxes (PDBs), such as but not limited to the type employed in vehicles and other devices to distribute power from a primary power source to a number of loads. The PDB may include top-down constructions in so far as the main components are laid one on top of the other. Wires used to distribute energy from a primary source to a number of loads may be connected from an underside of the PDB.

20 Claims, 4 Drawing Sheets

POWER DISTRIBUTION BOX

BACKGROUND OF THE INVENTION

1. Field of the Invention

The present invention relates to Power Distribution Boxes (PDBs), such as but not limited to the type employed in vehicles and other devices to distribute power from a primary power source to a number of loads.

2. Background Art

FIG. 1 illustrates a bottom-up Power Distribution Box (PDB) 10 commonly know in the art. The PDB includes a wedge 12, PDB frame 14, busbar 16, and protector plate 18. The busbar 16 is connected to a primary power source and configured to distribute current to a number of wires connected thereto. During assembly, the busbar 16 is secured to an underside of the frame 14 and then the wires are inserted through an underside of the protector plate 18 for connection to the busbar 16 by way of fuses included on the top side of the wedge 12. This bottom-up configuration is problematic for a number of reasons.

Attaching the busbar 16 to the underside of the frame 14 increases system costs as it requires insertion of an additional piece, the protector plate 18, to separate the wires from the electrically conducting surfaces of the busbar 16. Once the wires are inserted through the openings in the protector plate 18, the protector plate 18 must be slid along all the wires and/or the wires must be disconnected in order to access the busbar 16 or otherwise service the underside of the frame 14. The use of the additional protector plate therefore further complicates service and assembly rework.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 2:
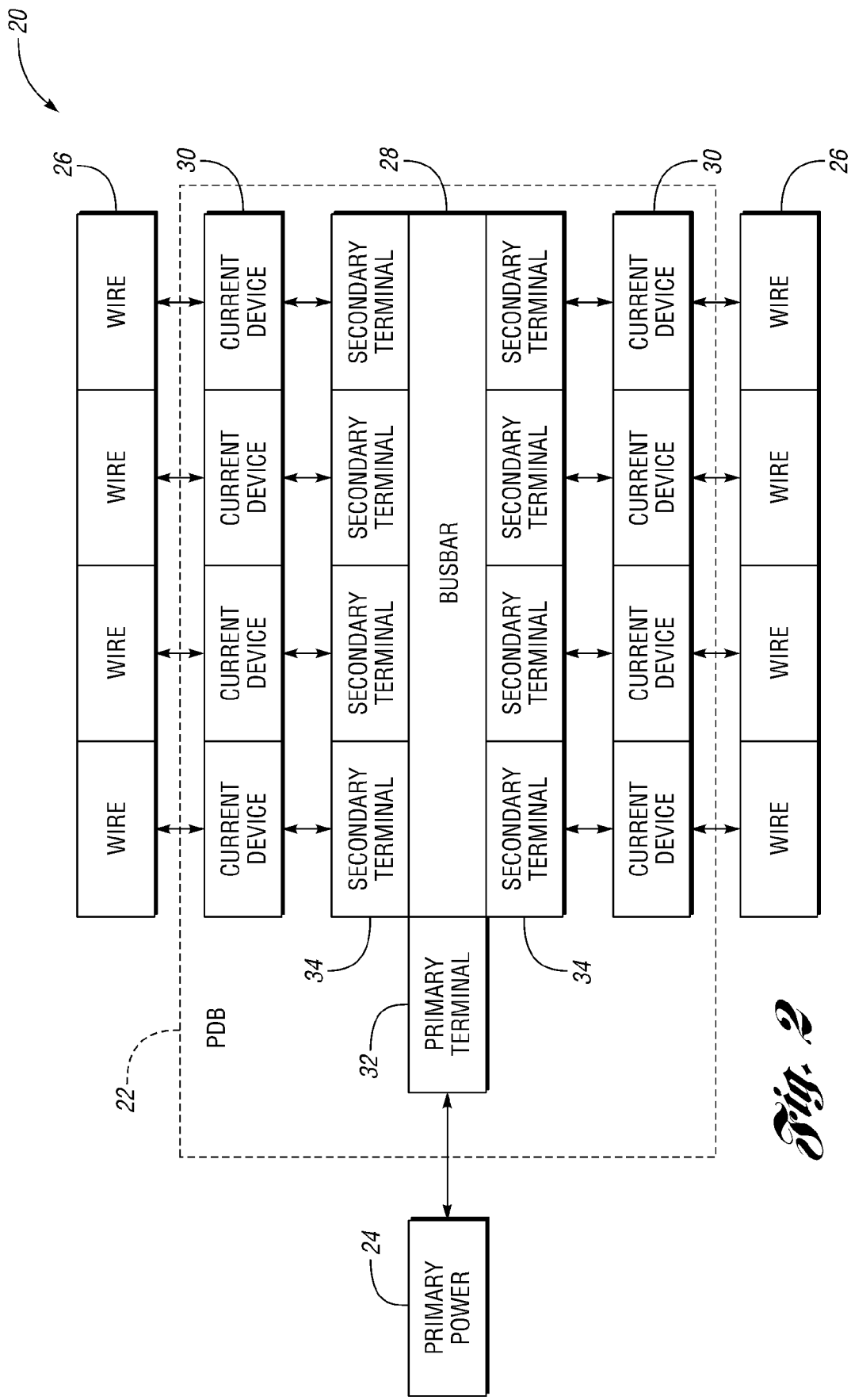
FIG. 2 schematically illustrates a power distribution system in accordance with one non-limiting aspect of the present invention.

FIG. 2 schematically illustrates a power distribution system 20 in accordance with one non-limiting aspect of the present invention. The system 20 generally includes a PDB 22 for distributing power between a primary power source 24 and a number of loads connected thereto by way of a number of wires 26. The PDB 22 may include any number of structural features associated with facilitating the electrical distribution, as described below in more detail. Included amongst these features may be a busbar 28 and a number of current control devices 30.

The busbar 28 may include a number of connection terminals for connecting to the busbar 28 and wires 30. A primary terminal 32 may be connected to the primary power source 24 and number of secondary terminals 34 may be connected to the wires 30. The current control devices 30, such as but not limited to fuses or relays, may be connected between to the busbar terminals 34 and the wires 26 to facilitate related current controls. In this manner, energy may be exchanged, by way of the PDB 22, or more particularly the busbar 28, between the primary power source 32 and loads or other devices connected to the wires 26 which may not be considered as loads.

Figure 3:
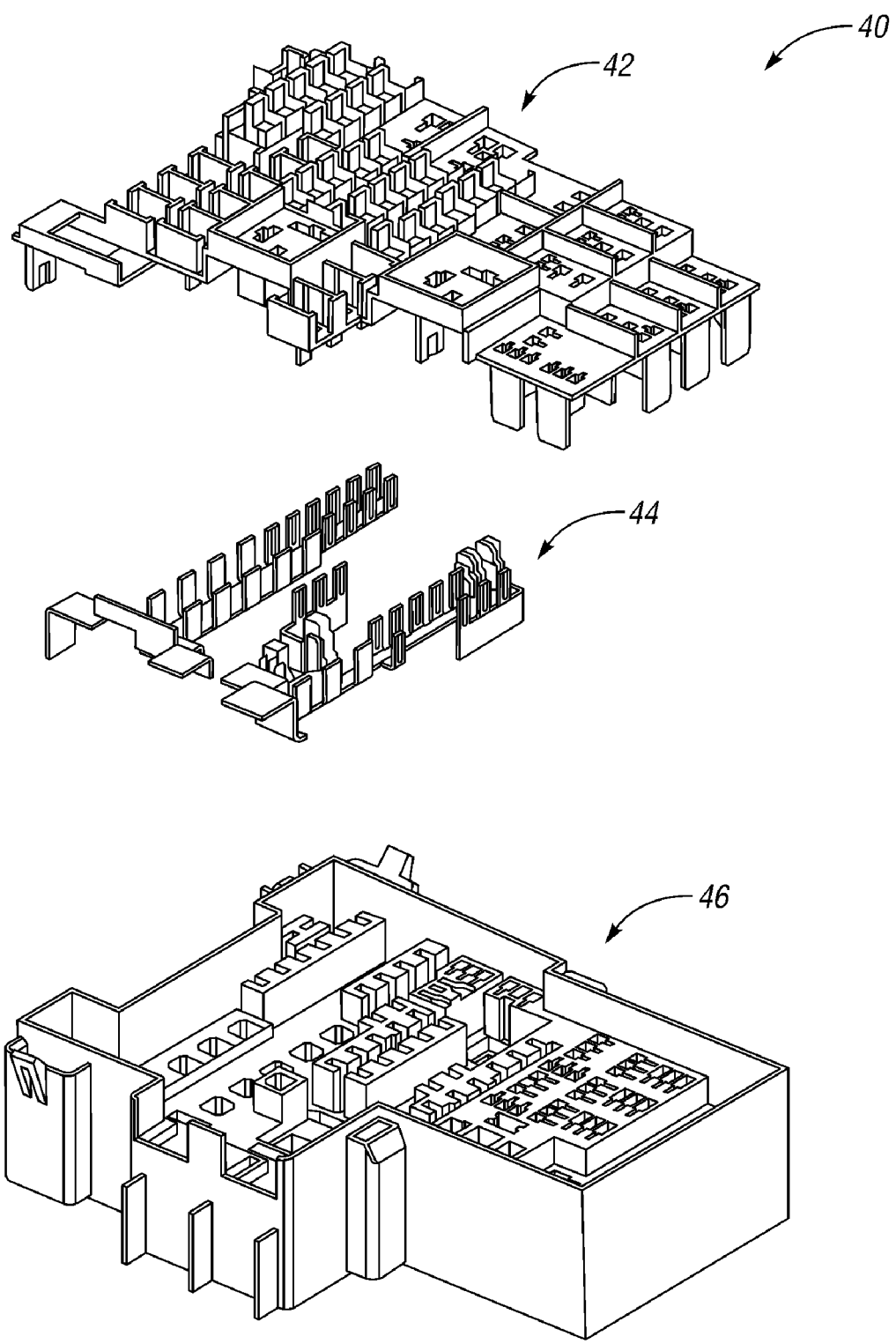
FIG. 3 illustrates the PDB in accordance with one non-limiting aspect of the present invention.

FIG. 3 illustrates a PDB 40 in accordance with one non-limiting aspect of the present invention. The PDB 40 may mainly include a wedge 42, busbar 44, and PDB frame 46. The busbar 44 may be attached to a top side of the frame 46 and covered with the wedge 42. The frame 46 may include a number of apertures for receipt of a number of wires (not shown). With the busbar 44 being located on a top side of the frame 46, as opposed to the bottom side shown in FIG. 1, the PDB 40 may be considered to be a top down PDB in so far as all the main components are attached to a top side of the frame 46.

Figure 1:
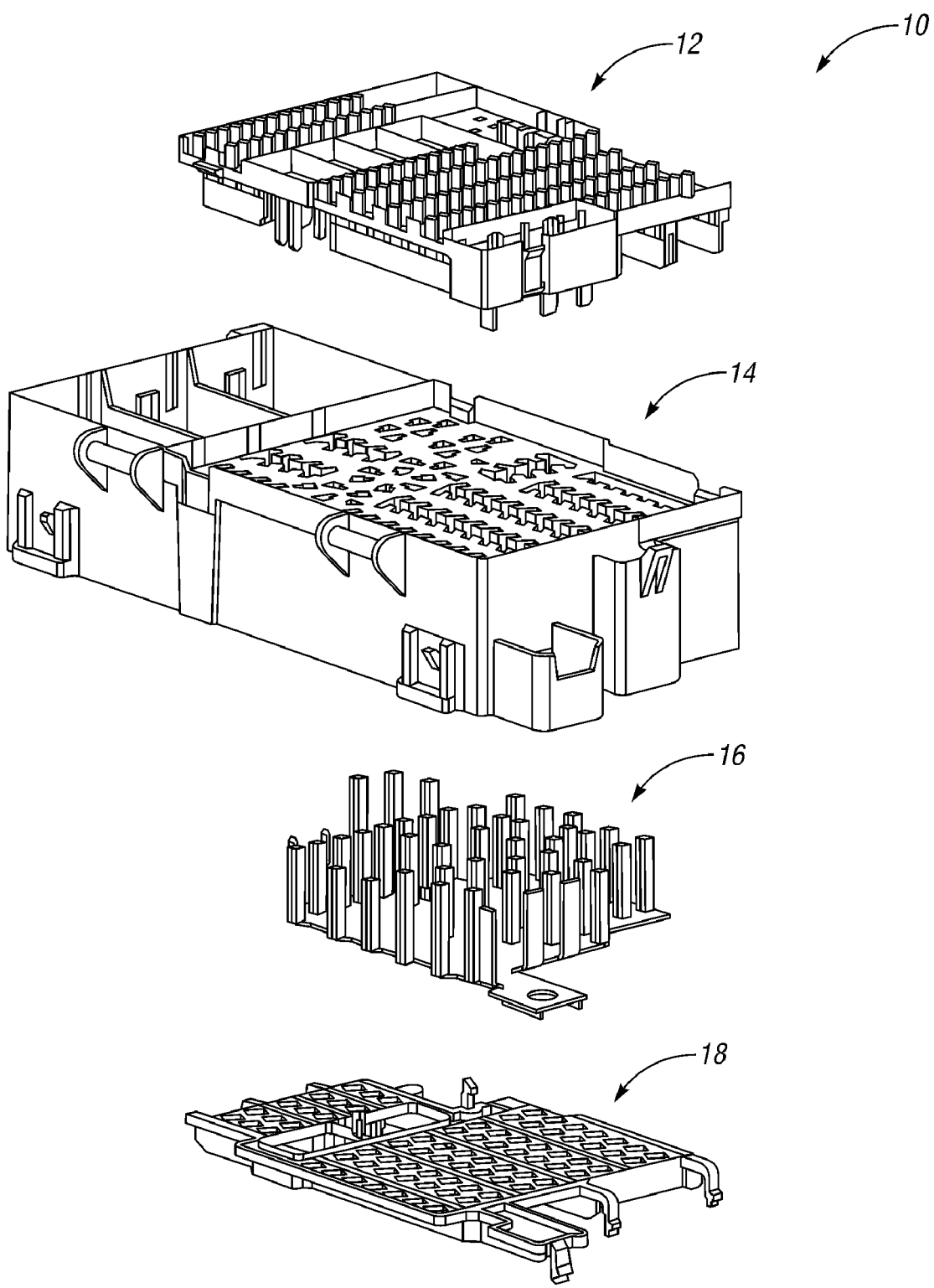
FIG. 1 illustrates a bottom-up Power Distribution Box (PDB) commonly know in the art.

The top side attachment of the busbar 44 eliminates the need for a protector plate, in contrast to the design shown in FIG. 1, as there is no need to electrically separate the wires from the busbar 44 due to the busbar 44 being physically and electrically isolated by the frame 46. This allows the present invention to eliminate the extra cost associated with protector plates. The wires may also be inserted through the frame 46 in an unobstructed manner due to the absence of the protector plate, allowing the bottom side of the frame 46 to be easily accessible for service and rework.

Figure 4:
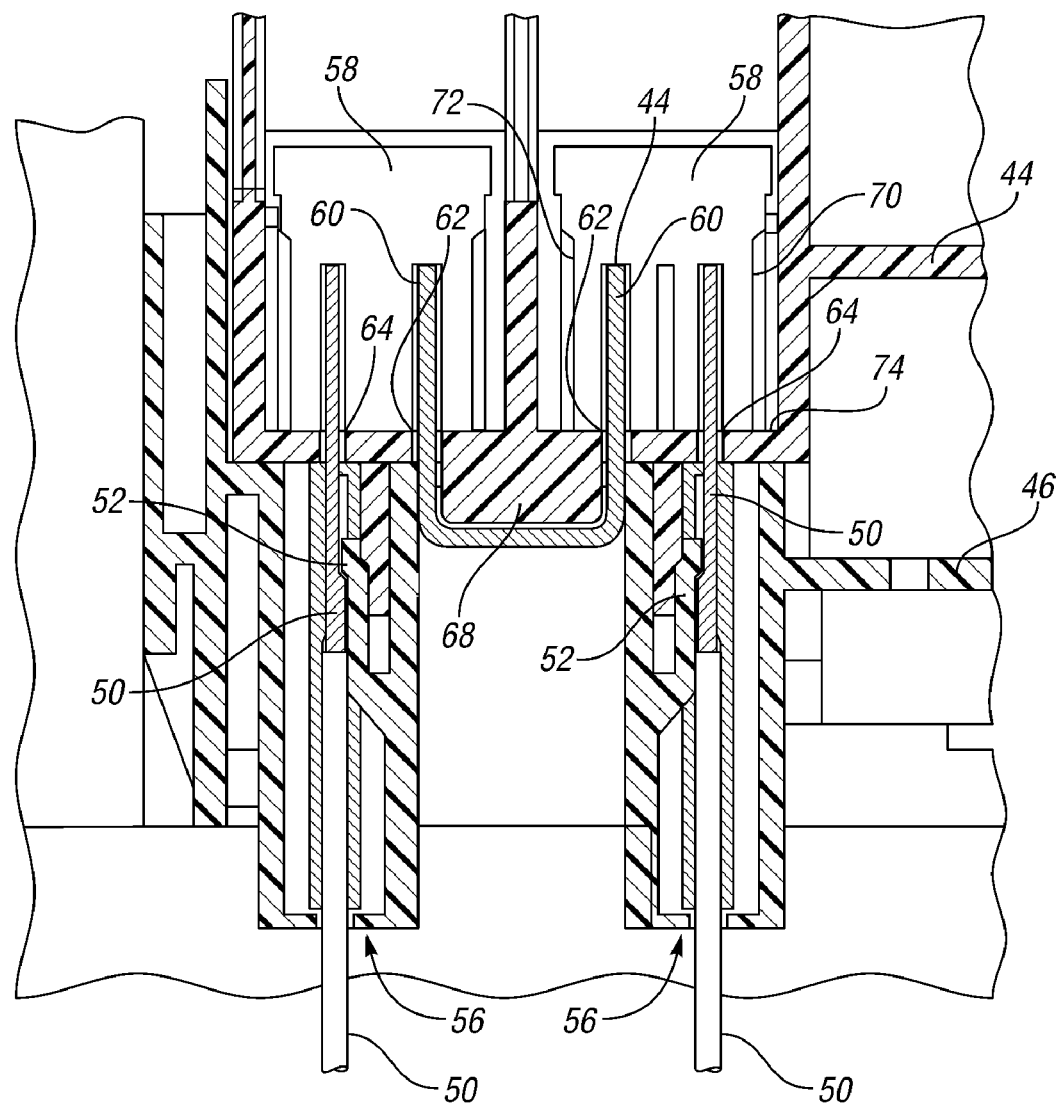
FIG. 4 illustrates a portion of the PDB in accordance with one non-limiting aspect of the present invention.

FIG. 4 illustrates a portion of the PDB 40 in accordance with one non-limiting aspect of the present invention. Wires 50 may include a blade 52 and connecting feature 54 at one end to facilitate retention within one of apertures 56 of the frame 46 having a corresponding connector. The connectors 52 may lock together to retain the wire 50 and be easily unlocked, such as with lateral pressure to the connector 52, to remove the wires from the bottom side of the frame 46. The blade 50 may extend through a top side of the frame 46 to connect with a current control device 58.

The busbar 44 may be separated from the wires 50 by a top side portion of the frame 46. A busbar terminal 60 may extend upwardly away from the frame 46 and in a direction similar to that of the wire terminal 50. Optionally, the busbar terminal 60 and wire blade 50 may be extend above to the top side of the frame 46 to a common height such that they are aligned with each other. The wedge 42 may include a aperture 62-64 for each of the busbar terminal 60 and wire blade 50 such that both features extend through a top side portion of the wedge 42.

A portion 68 of the wedge 42 may cover a central portion of the busbar 44. Another portion of the wedge 42 may provide shrouds or other features to facilitate retaining and securing the current control device 58. This allows the wedge 42 to facilitate electrically isolating a top side of the busbar 44 while also providing support for the current control devices 58. As shown, the busbar 44 is separate from the wedge 42 such that it is inserted into the frame prior to and separately from the wedge. Optionally, the busbar 44 may be integrated with the wedge 42. This may include connecting the busbar 44 to an underside of the wedge 42 and/or injection molding the wedge 42 around the busbar 44 such that both pieces are inserted at the same time in a unit of one-piece construction.

The current control device 58 may include two downwardly extending terminals 70-72 for connecting to the busbar terminal 60 and wire blade 50. The current control device 58 may be electronically or mechanically controllable to control current flow between the terminal 60 and blade 50. For example, if the device is a fuse, the fuse may mechanically open the connection if the current flow exceeds a predefined threshold, and/or if the device is a relay, the relay may be electronically controllably, such as but not limited by an electronic control module, to electrically open and close the connection between the terminal 60 and blade 50.

A portion 74 of the wedge 42 may support an underside of the current control device. This portion 74 and/or one of shrouds may include a connection feature, such as but not limited to a clip, to facilitate securing the current control device 58 within the wedge 42. Optionally, the current control device 58 may be inserted into the wedge 42, or the integrated wedge 42 and busbar 44, prior to insertion of the wedge 42 into the topside of the frame 46 so as to provide an integrated assembly of to the wedge 42, busbar 44, and current control device 58.

The busbar terminals 60 may include various shapes and sizes, depending on the current control device 58 connected thereto. As shown, the busbar 44 may include a portion of the terminals having a male connection configuration and a portion of the terminals having a female connection configuration. The busbar 44 may comprise any material having properties suitable to high current conditions. The busbar 44 may be a stamped product and produced in any number of sizes and shapes, with any number of connection terminals.

One non-limiting aspect of the present invention relates to a simplified PDB wherein connecting wires may be easily inserted from an underside of the frame and in a unobstructed manner is so far as no protector plate or other features is utilized with respect to separating or otherwise arranging the wires with respect to the underside of the frame. This arrangement also allows the wires to be individually removed by simply pulling on the wire or otherwise disengaging the connecting clips, and without the additional burden of having to remove a protector plate or slide the protector plate along a number of connected wires.

One non-limiting aspect of the present invention relates to the underside arrangement in that it allows the busbar to be reworked or otherwise relatively easily adjusted after assembly, i.e., after the wires are connected and the wedge is overlayed. The busbar being retained on the top side of the frame, and on an opposite side relative to the wires, allows it to be easily accessed by simply removing the wedge, and current control device if attached, without having to remove or significantly handle the wires.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A power distribution box (PDB) having a top-down construction, the PDB comprising:
   a PDB frame;
   an axially elongated, u-shaped busbar positioned on a topside of the frame, the busbar including axially elongated, laterally opposed busbar terminals extending upwardly from the PDB frame, the busbar configured to distribute energy from a primary power source to a number of loads, the u-shaped construction requiring the loads to connect to the upwardly extending terminals and not a bottom side of the busbar;
   a wedge positioned on a topside of the busbar to retain the busbar relative to the topside of the frame; and
   wherein a bottom side of the frame includes apertures for receipt of connecting wires used to electrically connect the busbar to the number of loads.

2. The PDB of claim 1 wherein the wires are received without assistance of a wire protector plate.

3. The PDB of claim 1 wherein an entry side of the apertures are unobstructed such that the wires are freely removable from the bottom side of the frame.

4. The PDB of claim 3 wherein a connector on the wires locks with a mating connector associated with the frame, the wires being removable by unlocking the connectors.

5. The PDB of claim 1 wherein the frame is configured to separate the busbar from the wires, the separation sufficient to prevent contact between the wires and busbar.

6. The PDB of claim 5 wherein the frame is a one-piece structure.

7. The PDB of claim 1 wherein the busbar is integrated into the wedge.

8. The PDB of claim 7 wherein the wedge is molded around the busbar.

9. The PDB of claim 1 wherein the connecting wires each include a blade that extends upwardly away from the PDB frame to a common elevation and in the same direction as the busbar terminals such that the blades of the connecting wires and the busbar terminals are parallel to each other.

10. The PDB of claim 9 further comprising at least one current control device connected between at least one busbar terminal and at least one of the wires, the at least one current control device electrically connecting the at least one busbar terminal to the at least one of the wires, the at least one busbar terminal and the at least one of the wires being electrically isolated from each other in the absence of the at least one current control device.

11. The PDB of claim 10 wherein the current control device includes two downwardly extending terminals for connecting to the busbar terminal and blade of the wire such that both of the busbar terminals and wire blade face in an upward direction relative to the downward direction of the current control device.

12. The PDB of claim 11 wherein the current control device is a fuse or relay.

13. The PDB of claim 1 wherein a bottom u-shaped portion of the busbar extends upwardly to the busbar terminals, the u-shaped portion being located below the topside of the frame and a top-end of the blades.

14. The PDB of claim 13 wherein the current control device includes two downwardly extending terminals for connecting to the busbar terminal and the blade of each wire such that both of the busbar terminals and wire blade face in an upward direction relative to the downward direction of the current control device.

15. The PDB of claim 14 wherein the current control device is a fuse or relay.

16. A power distribution box (PDB) having a top-down construction, the PDB comprising:
- a frame having a number of apertures for receipt of wires used to distribute current to a number of loads;
- an axially elongated, u-shaped busbar positioned on a topside of the frame and electrically isolated from the wires, the busbar having axially elongated, laterally opposed busbar terminals to facilitate distributing current from a primary power source, the busbar terminals extending upwardly away from the PDB frame, the u-shaped construction requiring loads to connect to the upwardly extending terminals;
- a wedge positioned on a topside of the busbar to retain the busbar between the topside of the frame and a bottom side of the wedge, the busbar terminals extending through the topside of the wedge;
- a number of wires extending through the bottom side to the topside of the frame, each wire including a blade and being connected to one of the loads, the blades extending through the topside of the wedge to a height equal to a height of the busbar terminals;
- a number of current control devices connected between the busbar terminals and the blades to establish an electrical connection therebetween, the electrical connection being sufficient to distribute current to loads associated with the blades, the wires and terminals being electrically isolated in the absence of the current control devices; and
- wherein an underside of the frame in unobstructed in so far as no additional features are used to arrange the wires relative to the apertures.

17. The PDB of claim 16 wherein the wires are received without assistance of a wire protector plate.

18. The PDB of claim 16 wherein the busbar is integrated into the wedge.

19. The PDB of claim 18 wherein the wedge is molded around the busbar.

20. A power distribution box (PDB) having a top-down construction, the PDB comprising:
- a frame having a number of apertures extending from a bottom side through a top side and including features to retain a wire inserted from the bottom side;
- a wedge retained on a topside of the frame, the wedge integrated with an electrically conducting busbar, the busbar exposed from a bottom side of the wedge, the wedge positioning the busbar relative to the frame so as to physically and electrically isolate the busbar from the wires such that the wires are unable to contact the busbar;
- a number of current control devices configured for receipt within a top side of the wedge to electrically connect the busbar to the wires; and
- wherein the busbar is u-shaped with an outwardly extending bottom portion and upwardly extending terminals, the upwardly extending terminals connecting to the wires, the outwardly extending bottom portion being located on the topside of the frame.

* * * * *